July 31, 1923.
E. DETTELBACH
WHEEL RIM
Filed Oct. 15, 1920
1,463,549
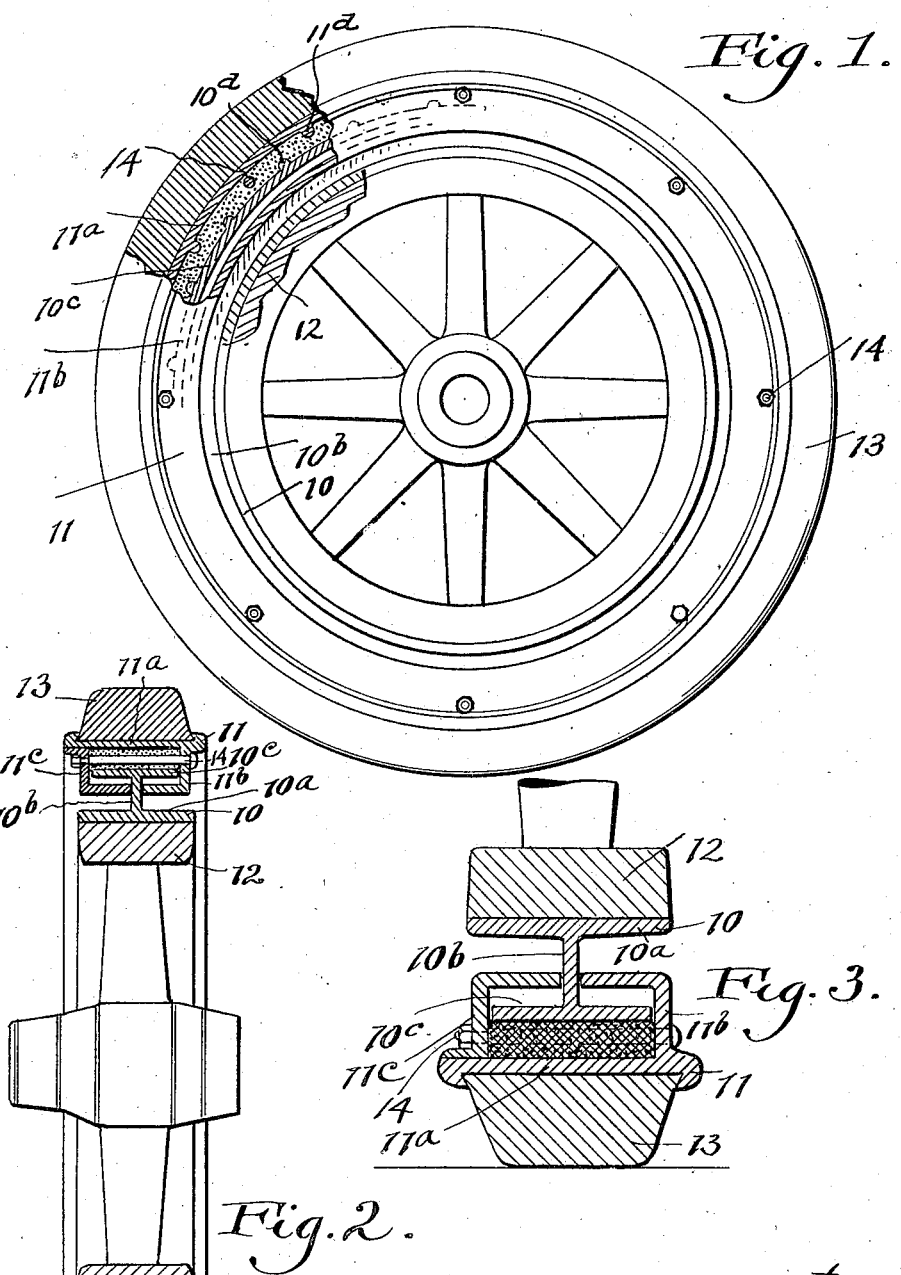

Patented July 31, 1923.

1,463,549

UNITED STATES PATENT OFFICE.

EDWARD DETTELBACH, OF CLEVELAND, OHIO.

WHEEL RIM.

Application filed October 15, 1920. Serial No. 417,195.

*To all whom it may concern:*

Be it known that I, EDWARD DETTELBACH, a citizen of the United States, residing at Cleveland, in the county of Cuyahoga and State of Ohio, have invented a certain new and useful Improvement in Wheel Rims, of which the following is a full, clear, and exact description.

This invention relates to vehicle wheels, and particularly to an improved rim structure composed of inner and outer parts connected by a yielding medium such as rubber, the inner member adapted to be fitted onto the felloe of a wheel and the outer member to support or carry a tire.

The invention aims to provide an efficient and practical construction of the nature above stated, and which will give a vehicle equipped with the wheels easy riding qualities while at the same time the necessity for pneumatic tires is eliminated.

A still further object is to provide a construction having the above characteristics and which is inexpensive to produce and is strong and durable.

In the accompanying sheet of drawings in which I have shown the preferred embodiment of the invention, Fig. 1 is a side view of my improved rim fitted onto a wheel; Fig. 2 is a transverse sectional view through the same; and Fig. 3 is as enlarged transverse sectional view through the rim structure.

My improved rim is in effect formed of two concentric members 10 and 11, the inner member 10 being adapted to be fitted onto the felloe 12 of a wheel which per se may be of standard construction and may have any suitable form. The outer member 11 is yieldingly supported on the inner member 10 and carries the tire 13 which may be and preferably is a solid rubber tire commonly called a cushion tire.

The invention resides particularly in the construction of the inner and outer members 10 and 11, in the relative arrangement of their parts and in the manner in which the outer or tire carrying member is yieldingly supported on the inner member. It will be seen from the following description that the construction in effect provides what may be termed a rim within a rim, both parts carrying an annulus of rubber or equivalent material.

The inner member 10 of the rim structure is substantially I-shaped in cross-section inasmuch as it has an inner flange or base $10^a$ which engages and is secured in any desired manner to the felloe 12, a vertical web $10^b$ and an outer flange $10^c$ preferably parallel to the inner flange $10^a$ and of slightly less width than the latter.

The outer rim member 11 is preferably substantially rectangular in cross-section as it has an outer annular tire supporting portion $11^a$ and two portions $11^b$ and $11^c$ which extend radially inward in parallel relation and then project axially inward toward each other leaving between their adjacent edges an annular slot of substantially the width of the web $10^b$ of the inner part 10.

The outer annular part $11^a$ and one of the inwardly extending parts $11^b$ and $11^c$ are integral or relatively rigid. They may be formed in one piece or in separate pieces in which event they will be brazed or otherwise secured together, and in this case the portions $11^a$ and $11^b$ are shown continuous or as being formed of one piece. However, the other inwardly extending portion, in this case the portion $11^c$, is a separate part or member designed to be secured to the companion portion $11^b$ by bolts 14. In this instance, though not necessarily, the bolts are shouldered and the part $11^c$ is clamped by nuts on the bolts against the shoulders.

It will be observed that the outer boxlike rim member 11 encloses a portion of the web $10^b$ and the outer flange $10^c$ of the inner member 10, the web extending outwardly through the annular slot between the inturned portions of the parts $11^b$ and $11^c$. In the preferred construction these inturned portions of the parts $11^b$ and $11^c$ engage opposite sides of the web $10^b$ and the parallel portions of the parts $11^b$ and $11^c$ which extend radially inward engage the opposite edges of the flange $10^c$, that is to say the flange $10^c$ extends across the rectangular space within the outer member 11. This arrangement will permit relative movement of the two members 10 and 11 in the plane of the wheel and will prevent relative lateral movement between these members.

In order that the outer member 11 may be yieldingly supported on the inner member 10, the space between the outer flange $10^c$ of the member 10 and the outer annular portion $11^a$ of the member 11 is filled with rubber, preferably fairly soft rubber which is poured into place while in a plastic or melted condition between these two portions of the parts 10 and 11 while the latter are held in concentric relationship and preferably after the bolts 14 are set in place.

Relative circumferential movement between the outer members 10 and 11 is prevented by the bolts 14 and preferably also by lugs 10$^d$ and 11$^d$, which extend outwardly and inwardly respectively from the flange 10$^c$ of the member 10 and from the annular portion 11$^a$ of the member 11.

The members 10 and 11 of the rim may be formed of any suitable material, but preferably from sheet metal stampings, although of course they may be otherwise formed.

This construction allows the outer rim member to yield or give in a radial direction or in the plane of the rim, and thus provides a greater resiliency and gives smoother riding qualities to a vehicle equipped with wheels having my improved rim construction than is obtainable from cushion tires only. In fact, with the inner annular body of fairly soft rubber yieldingly connecting the members 10 and 11, and with the outer rubber tire 13, I believe that substantially the same riding qualities are obtained as with a wheel of ordinary rim construction having a pneumatic tire.

Having described my invention, I claim:

1. A rim for a vehicle wheel composed of inner and outer members, the former adapted to be secured to a wheel and the other to support a tire, the inner member being substantially I-shaped and having its outer flanged portion enclosed by the outer member, and cushioning means interposed between the outer flanged portion of the inner member and the outer member.

2. A rim for a vehicle wheel composed of inner and outer members, the inner member adapted to be fitted onto a wheel and having a web and a flanged outer portion, said outer member forming an enclosure composed of outer, side and inner portions which receive the flanged outer portion of the inner member, and cushioning means upon the outer side of the flanged outer portion of the inner member and enclosed by said outer member.

3. A rim for a vehicle wheel composed of inner and outer members, the inner member adapted to be fitted onto a wheel and yieldingly supporting the outer member, and the latter adapted to support a tire, said outer member forming an enclosure composed of outer, side and inner portions which receive the outer portion of the inner member, and a body of rubber between the outer portions and the inner and outer members.

4. A rim for a vehicle wheel composed of inner and outer members, the latter yieldingly supported on the former, the outer member having outer, side and inner portions forming a substantially rectangular enclosure, and the inner member being substantially I-shaped in cross-section and having its outer portion received within said enclosure, and an elastic medium between the outer portions of the inner and outer members.

5. A rim for a vehicle wheel composed of inner and outer members, the former adapted to be fitted onto a wheel and the outer member to support a tire, the outer member having outer, side and inner portions forming an enclosure with a slot at the inner periphery thereof, and the inner member having a web extending through said slot, and having an outer flange-like portion extending across said enclosure and a body of yieldable or elastic material between said inner and outer members.

6. A rim for a vehicle wheel composed of inner and outer members, the former adapted to be fitted onto a wheel and the other to support the tire, the outer member having outer, side and inner portions forming an enclosure having a slot at its inner periphery, and the inner member having an outstanding web of substantially the width of said slot and extending through the same into the enclosure, and having an outer flange-like portion in the enclosure and extending across the same and of substantially its width, and a body of yieldable or elastic material between said members.

In testimony whereof, I hereunto affix my signature.

EDWARD DETTELBACH.